Patented Apr. 25, 1939

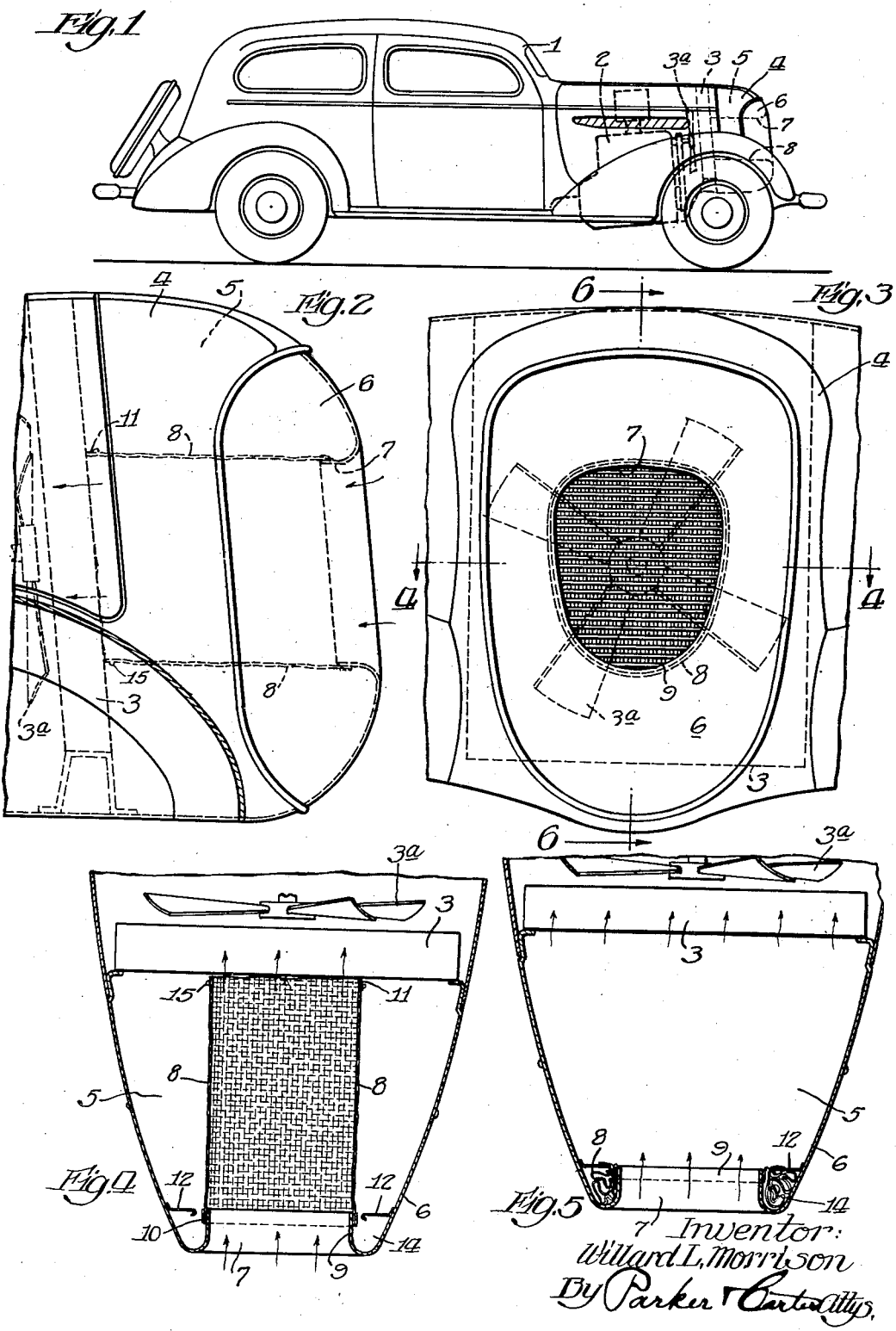

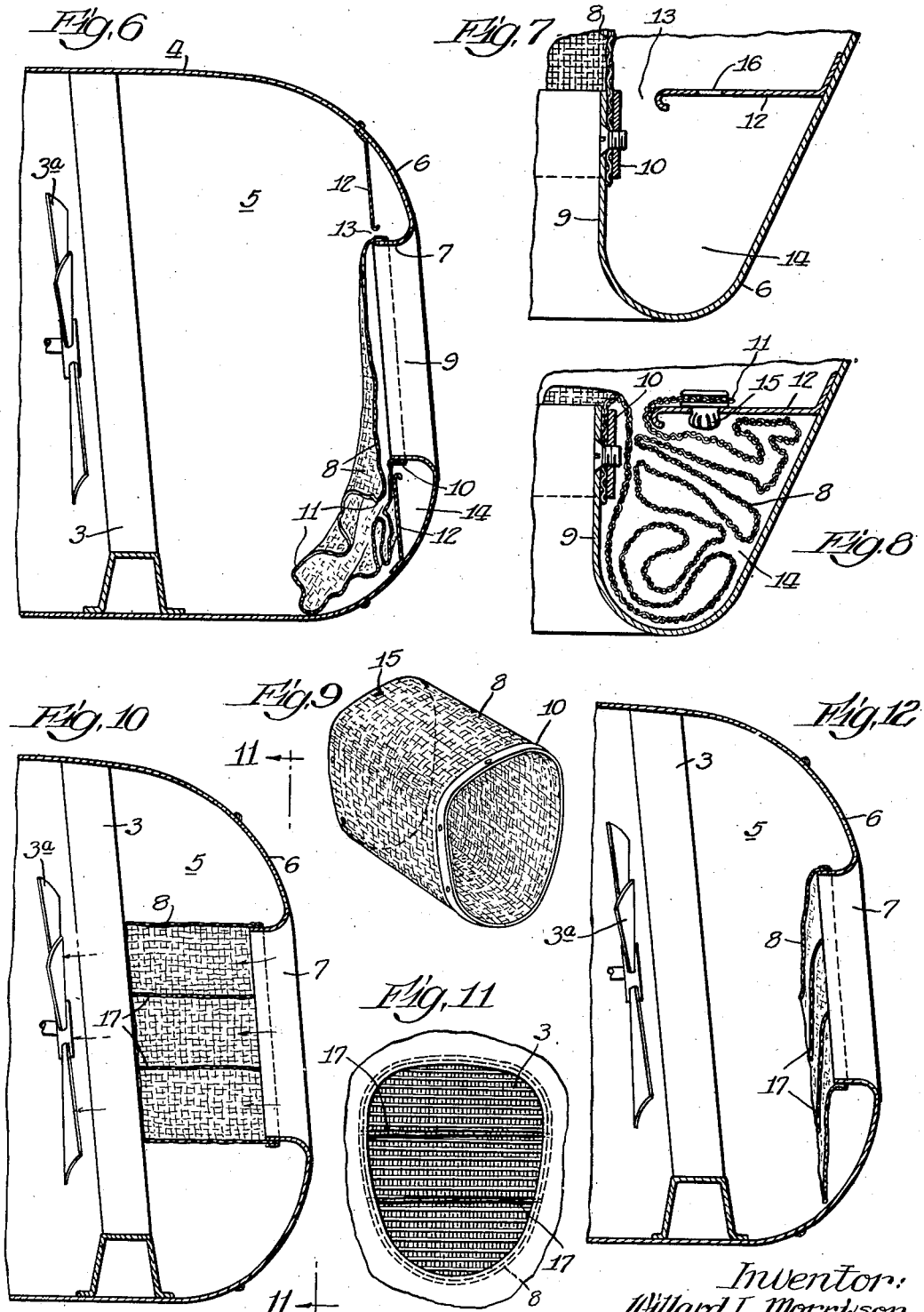

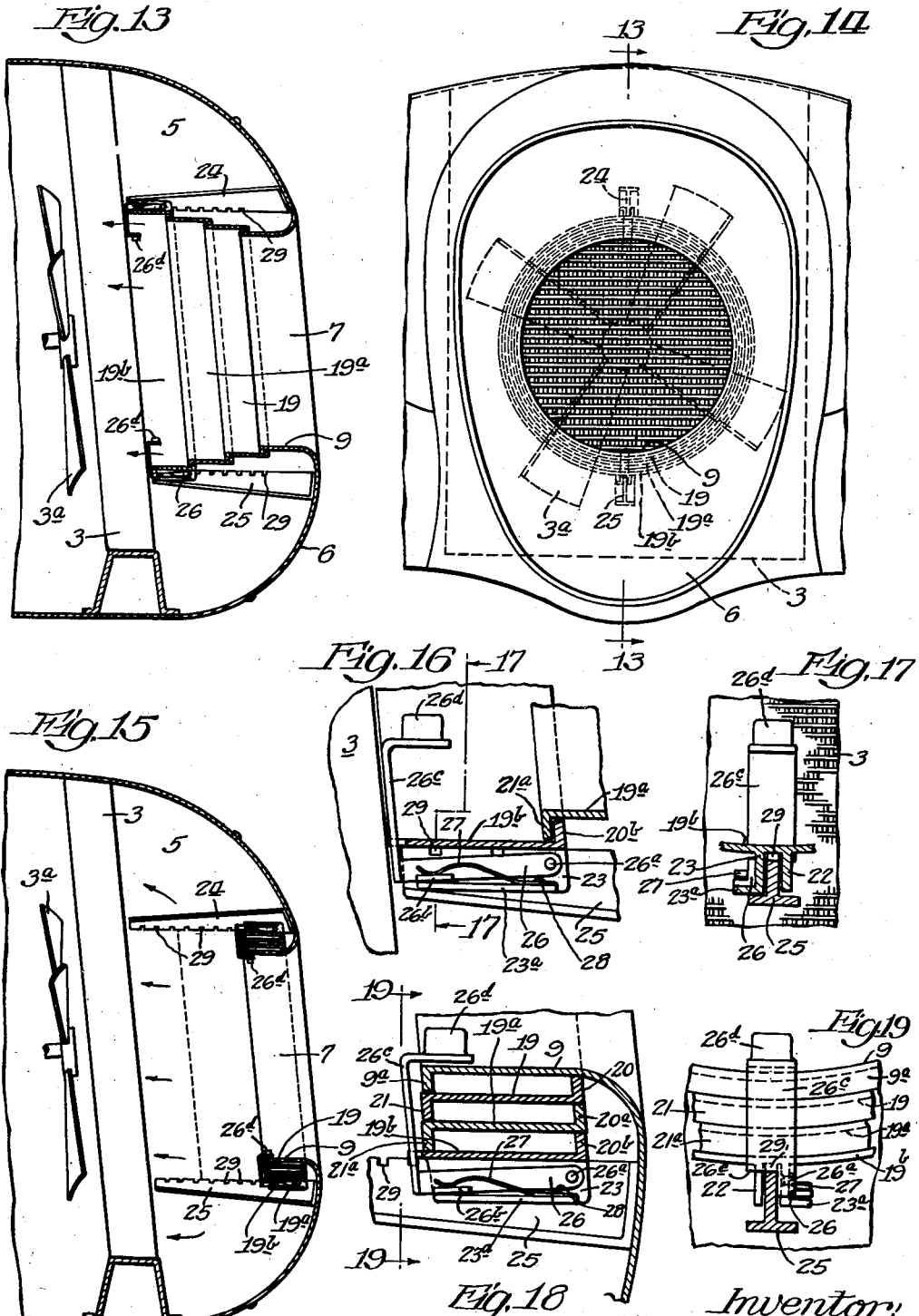

2,155,439

UNITED STATES PATENT OFFICE 2,155,439

CONTROLLING MEANS FOR COOLING SYSTEMS OF INTERNAL COMBUSTION ENGINES

Willard L. Morrison, Lake Forest, Ill.

Application April 1, 1936, Serial No. 72,137

13 Claims. (Cl. 257—132)

This invention relates to controlling means for cooling systems of internal combustion engines and has for its object to provide a new and improved device of this description.

The invention has as a further object to provide a device of the kind described wherein a portion of the radiator is closed off entirely around, leaving a central opening for the air to enter, with a conduit leading from the central opening to the central part of the radiator. The invention has as a further object to provide a device of the kind described with a conduit which may be moved out of the way when desired. The invention has as a further object to provide a device of the kind described, in which the conduit automatically moves when the vehicle stops, so as to automatically close off the opening through which the air enters and maintain heat in the space between the opening and the radiator. The invention has other objects which are more particularly pointed out in the accompanying description.

Referring now to the drawings, Fig. 1 is a side view of a vehicle provided with a controlling means embodying the invention;

Fig. 2 is an enlarged view of the front end of the vehicle, with parts shown in section and parts in dotted lines;

Fig. 3 is a front view of the device shown in Fig. 2;

Fig. 4 is a sectional view taken on line 4—4 of Fig. 3, showing the conduit in its operative position;

Fig. 5 is a view similar to Fig. 4 showing the conduit out of operative position;

Fig. 6 is a sectional view taken on line 6—6 of Fig. 3 when the vehicle is stationary, showing the conduit covering the air admission opening;

Fig. 7 is an enlarged sectional view of the lower right hand portion of Fig. 4, showing the pocket for the air conduit when not in use;

Fig. 8 is a view similar to Fig. 7, showing the air conduit;

Fig. 9 is a perspective view showing one form of the air conduit separate from the other parts;

Fig. 10 is a view similar to Fig. 2, except that it is in section and shows a modified construction;

Fig. 11 is a view taken on line 11—11 of Fig. 10;

Fig. 12 is a view similar to Fig. 10, showing the air conduit when the engine is stopped or running slowly;

Fig. 13 is a view similar to Fig. 10, taken on line 13—13 of Fig. 14, showing a modified construction;

Fig. 14 is a front view of Fig. 13 with parts broken away;

Fig. 15 is a view similar to Fig. 13, showing the air conduit in its inoperative position;

Fig. 16 is an enlarged view of the lower portion of the conduit of Fig. 13 just in front of the radiator;

Fig. 17 is a sectional view taken on line 17—17 of Fig. 16;

Fig. 18 is an enlarged view showing the lower part of the air conduit when in its inoperative position as shown in Fig. 15; and Fig. 19 is a sectional view taken on line 19—19 of Fig. 18.

Like numerals refer to like parts throughout the several figures.

In the cooling systems of internal combustion engines for vehicles as now manufactured, the radiator and the fan are arranged of the proper size for summer use, to provide the maximum cooling area of the radiator to take care of the high summer temperatures. The radiator and the fan are therefore too large for winter use, so that the cooling liquid for the engine is brought to a temperature which is below the efficient temperature for the engine. The present invention provides means for remedying this defect. In the present device, there is provided an opening in the front of the vehicle and a conduit leading to the radiator, the conduit acting to limit the area of the radiator through which the cooling air passes. There is also provided a conduit which not only acts to limit the area of the radiator through which the cooling air passes, but when the vehicle stops automatically acts to close the opening in the front of the vehicle so as to maintain the heated air in the space between this opening and the radiator.

Referring now to the drawings, wherein I have illustrated certain forms of the device embodying the invention, there is illustrated a vehicle I having an internal combustion engine 2 with a radiator 3 and the fan 3a. There is a projecting part 4 in front of the radiator which provides an air space 5 between it and the radiator and there is an opening at the front through which air passes when the vehicle is in motion. This opening may be of any desired size. I prefer to provide means for reducing the size of this opening in cold weather by providing, for example, a reducing device 6 which closes the peripheral portion of the opening, leaving a central opening 7. Associated with the central opening is an air conduit 8 which may be fastened in position in any desired manner. A simple way of doing this is to provide an inwardly projecting member 9 surrounding the opening, the conduit being fastened to this inwardly projecting member in any desired manner, as by means of the band 10. The air conduit 8 is preferably of such length that when in its operative position, its inner end 11 is in close proximity to the radiator 3, so that the air passing through the air conduit passes through the central portion of the radiator and substantially closes off the rest of the radiator, as clearly shown for example in Fig. 4.

As illustrated in Figs. 4 and 5, for example, the air conduit 8 is made of flexible material, preferably fabric of some kind. When the vehicle is in motion, the air passing through the opening 7 maintains the air conduit 8 in its operative position so that the air passes through the central or middle portion of the radiator. When the vehicle is stopped, this air conduit 8 drops down as shown in Fig. 6, so as to close off the opening 7 and confine the warm air in the space 5, as shown in Fig. 6, this warm air preventing the temperature of the radiator from being lowered to too great an extent. It will thus be seen that by means of this construction the air conduit is maintained in its operative position when the vehicle is in motion, so that it confines the admission of the air to the central portion of such radiator, and when the vehicle stops this air conduit automatically takes a position to close off the opening in the front of the vehicle through which the cooling air enters, and the air conduit is automatically moved to these various positions without the necessity of requiring any apparatus for moving it.

The air conduit may be moved to an inoperative position, if desired, and maintained in that position so that it does not control the air to the radiator or close off the opening to the outside air. This may be accomplished in any desired manner. A simple way of accomplishing this is to provide a projecting member 12 on the inside of this device, as shown in Figs. 4 to 8. There is a space 13 between the projecting member 12 and the member 9. When it is desired to put the air conduit out of use, it is simply folded up in the receptacle 14 between the projecting member 12 and the front end of the vehicle. Figs. 5 and 8 are views showing the air conduit folded up into this receptacle. The inner end of the air conduit 8 may be provided with suitable fastening devices to fasten it in position when it is folded. For the purposes of illustration, I have shown this inner end as provided with a series of snap buttons 15, see Figs. 4 and 8, which snap into openings 16 in the projections 12, see Figs. 7 and 8, so as to hold the air conduit in proper position. It will be seen that the air conduit can be easily placed in operative position or removed therefrom.

The discharge end of the air conduit in proximity to the radiator is preferably smaller in diameter than the fan and will be made the proper diameter so that the proper amount of cooling air will be passed through the radiator to maintain the cooling liquid at the proper temperature for efficient operation of the engine. By maintaining the opening 7 and the air conduit the proper size, it will be seen that the cooling effect of the cooling air on the cooling liquid for the engine will be reduced a sufficient amount to maintain the temperature of this cooling liquid at the desired point in the coldest weather. It will thus be seen that there is provided here controlling means for cooling systems of internal combustion engines which insures the proper control of the temperature of the cooling liquid. By closing off the opening, so as to maintain the heat in the space or compartment 5, there is provided means whereby after making the ordinary stops, the cooling liquid for the engine will not be cooled to any great amount, but will be maintained at such a temperature as to secure an effective starting of the engine, even in exceedingly cold weather.

Figs. 10, 11 and 12 show a modified construction particularly adapted to be used where the distance between the radiator 3 and the mouth of the opening 7 is comparatively short as compared with the diameter of the opening 7, so that a device like that illustrated in Fig. 4 would not be long enough to close the opening 7. In this construction the air conduit 8 is provided with one or more longitudinally extending partitions 17. This does not interfere with the air passing through the conduit when the vehicle is in motion and the air conduit is in its operative position. When the vehicle stops and the air conduit drops down, as shown in Fig. 12, these partitions 17 insure closing off of the opening 7.

There is illustrated in Figs. 13 to 19 a further modified construction wherein the air conduit is made of rigid material, but is made collapsible. In this construction there is provided a series of collapsible sections 19, 19a and 19b which are mounted on the inwardly projecting member 9 and which are adapted to be moved outwardly, as shown in Fig. 13, until the innermost section is in proximity to the radiator. Means are provided for preventing the sections from becoming disconnected. For this purpose the inwardly projecting member 9 has the stop 9a thereon which is engaged by the engaging part 20 on the member 19. This member 19 has the stop 21 which is engaged by the engaging part 20a on the member 19a. The member 19a has the stop 19b which is engaged by the engaging part 20b on the member 19b. These stops and engaging parts are so positioned as to permit the sections to be moved to bring the end of the collapsible conduit in proximity to the radiator. A plurality of guiding members 24 and 25 are provided and are supported at their outer ends on some fixed part, as the part 6. These guiding members are provided with notches 29. The collapsible section 19b is provided with guides 22 and 23, see Figs. 17, 18 and 19, between which is received the guiding members 24 and 25. Pivoted to the guides 23 in proximity to the guiding devices 24 and 25 are arms 26, to each of which is connected an angular member 26c, having an engaging portion 26e which fits into one of the slots 29, depending upon the position of the parts. A spring 27 is attached to each guide 23 in any desired manner, as by being fastened at 28 to a laterally extending flange 23a and engaging the member 26 in any desired manner, as by engaging the flange 26b thereon, see Figs. 16 and 18. These springs normally hold the engaging parts 26e in the notches 29. Connected to each angular piece 26c is a knob or handhold 26d, by means of which the parts 26c and 26 may be moved to disconnect the engaging parts 26e from the slots 29 so as to permit the movement and adjustment of the collapsible members. When it is desired to move the collapsible conduit into its operative position, as shown in Fig. 13, the knobs 26d are grasped and moved toward each other to release the collapsible sections and these sections are then moved toward the radiator to the position shown in Fig. 13 and the knobs then released, whereupon the springs 27 move the parts so that the engaging parts 26e enter one of the slots 29, thus holding the parts in their operative position. When it is desired to move the conduit to its inoperative position, the knobs 26d are grasped and moved toward each other and the collapsible sections are then moved outwardly into a position surrounding the part 9, see Figs. 15 and 18, whereupon the knobs are released and the springs 27 move the parts 26e into the notches 29 to hold the collapsible sections in their inoperative position. When the collapsible members are in the position shown in Fig. 13, it will be seen that the air passes only through a portion of the radiator. When the collapsible members are in the position shown in Fig. 15, the air passes through a larger portion of the radiator. The portion of the radiator through which the air passes can therefore be regulated and controlled by moving the collapsible members to various intermediate positions and maintaining them in any such position by means of the notches 29 and the engaging parts 26e.

I claim:

1. A controlling means for cooling systems of internal combustion engines on movable devices, comprising a radiator, a casing surrounding the radiator having an opening at the front thereof, and a conduit on the interior of the casing and extensible longitudinally toward the radiator, the inner end thereof being in proximity to said radiator and being smaller in cross sectional area than the cooling surface of the radiator, so as to limit the passage of the air through the radiator to a portion of such radiator.

2. A controlling means for cooling systems of internal combustion engines on movable devices, comprising a radiator, a casing surrounding the radiator having an opening at the front thereof, and a conduit leading from said opening to said radiator, of fixed cross sectional area when in its operative position, the inner end of said conduit being smaller than the radiator and in proximity thereto, so as to limit the passage of the air through the radiator to a portion of such radiator, and means for holding said conduit in an operative position.

3. A controlling means for cooling systems of internal combustion engines on movable devices, comprising a radiator, a casing surrounding the radiator having an opening at the front thereof, and a flexible conduit leading from said opening to said radiator, so as to limit the passage of the air through the radiator to a portion of such radiator the inner end of said conduit being smaller in cross sectional area than the cross sectional area of the radiator.

4. A controlling means for cooling systems of internal combustion engines on movable devices, comprising a radiator, a casing surrounding the radiator having an opening at the front thereof, and a flexible conduit leading from said opening to said radiator, said flexible conduit having its end next to the radiator free, the air passing through said opening and conduit maintaining the conduit in its operative position.

5. A controlling means for cooling systems of internal combustion engines on movable devices, comprising a radiator, a casing surrounding the radiator having an opening at the front thereof, and a flexible conduit leading from said opening to said radiator, said flexible conduit automatically closing said opening when the movable device is stopped.

6. A controlling means for cooling systems of internal combustion engines on movable devices, comprising a radiator, a casing surrounding the radiator having an opening at the front thereof, and a flexible conduit leading from said opening to said radiator, and a longitudinal partition in said flexible conduit.

7. A controlling means for cooling systems of internal combustion engines on movable devices, comprising a radiator, an air moving device for moving air through the radiator, a casing surrounding the radiator having an opening at the front thereof, a conduit leading from said opening to said radiator, said conduit having a discharge end smaller in cross sectional area than the cross sectional area of the radiator, so as to limit the passage of the air through the radiator to a portion of such radiator, and a storage space surrounding said opening and into which the conduit is stored when not in use, the conduit when thus stored forming no part of the passageway through which the air passes to the radiator.

8. A controlling means for cooling systems of internal combustion engines on movable devices, comprising a radiator, an air moving device for moving air through the radiator, a casing surrounding the radiator having an opening at the front thereof, and a collapsible conduit leading from said opening to said radiator, said conduit having a discharge end smaller in cross sectional area than the cross sectional area of the radiator, so as to limit the passage of the air through the radiator to a portion of such radiator, said conduit being collapsed by moving its inner end away from the radiator.

9. A controlling means for cooling systems of internal combustion engines on movable devices, comprising a radiator, a casing surrounding the radiator having an opening at the front thereof smaller in dimension than the front of the radiator, an air conduit connected with said opening and extending inwardly, the inner end of said conduit being in proximity to said radiator and being smaller in cross sectional area than the cooling surface of the radiator, and means for holding the inner end of said conduit in various intermediate positions between said opening and said radiator.

10. A controlling means for cooling systems of internal combustion engines on movable devices, comprising a radiator, a casing surrounding the radiator having an opening at the front thereof, an air conduit comprising a plurality of collapsible sections, said conduit having one end in position to receive air passing through said opening, the other end being in proximity to the outer face of the radiator and within the boundary walls of the radiator, and supporting means at the other end thereof, the inner end of the conduit being movable longitudinally with relation to the casing to bring it into its operative position.

11. A controlling means for cooling systems of internal combustion engines on movable devices, comprising a radiator, a casing surrounding the radiator having an opening at the front thereof, an air conduit comprising a plurality of collapsible sections, each section having a continuous periphery, said conduit having one end in position to receive air passing through said opening and supporting means at the other end thereof, the inner end of the conduit being movable longitudinally with relation to the casing to bring it into its operative position, and means for varying the length of said conduit.

12. A controlling means for cooling systems of internal combustion engines on movable devices, comprising a radiator, a casing surrounding the radiator having an opening at the front thereof, an air conduit comprising a series of collapsible sections movably connected together so as to be extended, one of said sections being in proximity to said opening, the sections when extended forming an air conduit for directing the air upon the radiator.

13. A controlling means for cooling systems of internal combustion engines on movable devices, comprising a radiator, a casing surrounding the radiator having an opening at the front thereof, an air conduit comprising a series of collapsible sections movably connected together so as to be extended, one of said sections being in proximity to said opening, the sections when extended forming an air conduit for directing the air upon the radiator, and means for maintaining the inner end of said conduit in various positions intermediate the opening and the radiator.

WILLARD L. MORRISON.